(12) United States Patent
Anand et al.

(10) Patent No.: US 7,313,379 B2
(45) Date of Patent: Dec. 25, 2007

(54) GENERATION OF A SELF-CORRECTING LOCAL OSCILLATION

(75) Inventors: Seema Anand, Marina del Ray, CA (US); Ahmadreza Rofougharan, Los Angeles, CA (US)

(73) Assignee: Broadcom Corporation, Irvine, CA (US)

(*) Notice: Subject to any disclaimer, the term of this patent is extended or adjusted under 35 U.S.C. 154(b) by 616 days.

(21) Appl. No.: 10/910,382

(22) Filed: Aug. 3, 2004

(65) Prior Publication Data

US 2005/0009491 A1    Jan. 13, 2005

(51) Int. Cl.
*H04B 1/06* (2006.01)
*H04B 7/00* (2006.01)

(52) U.S. Cl. .................. 455/257; 455/255; 455/260

(58) Field of Classification Search ............. 455/260, 455/255, 257, 259, 112, 113, 205, 118, 207; 331/2, 16, 18, 22, 25; 327/147, 156; 332/126–127, 332/123
See application file for complete search history.

(56) References Cited

U.S. PATENT DOCUMENTS

| | | | | |
|---|---|---|---|---|
| 5,499,393 A * | 3/1996 | Fukui | .................... | 455/264 |
| 6,819,910 B2* | 11/2004 | Shi et al. | .................... | 455/126 |
| 6,829,550 B2* | 12/2004 | Kim | .................... | 702/107 |
| 6,850,745 B2* | 2/2005 | Anand et al. | .................... | 455/260 |
| 6,891,440 B2* | 5/2005 | Straub et al. | .................... | 331/1 R |
| 6,999,744 B2* | 2/2006 | Kim | .................... | 455/310 |
| 7,079,595 B2* | 7/2006 | Jensen et al. | .................... | 375/319 |
| 7,110,469 B2* | 9/2006 | Shi et al. | .................... | 375/295 |
| 2001/0053176 A1* | 12/2001 | Fry et al. | .................... | 375/133 |

* cited by examiner

*Primary Examiner*—Sonny Trinh
(74) *Attorney, Agent, or Firm*—Garlick Harrison & Markison; Timothy W. Markison; Kevin L. Smith

(57) ABSTRACT

A method and apparatus for generating a self-correcting local oscillation includes processing that begins by generating a frequency correction signal that represents undesired tones introduced by the self-correcting local oscillation. The processing continues by generating an auxiliary frequency based on the frequency correction signal. The processing continues by compensating a synthesized frequency based the auxiliary frequency to produce a local oscillation.

7 Claims, 8 Drawing Sheets integrated radio receiver 10

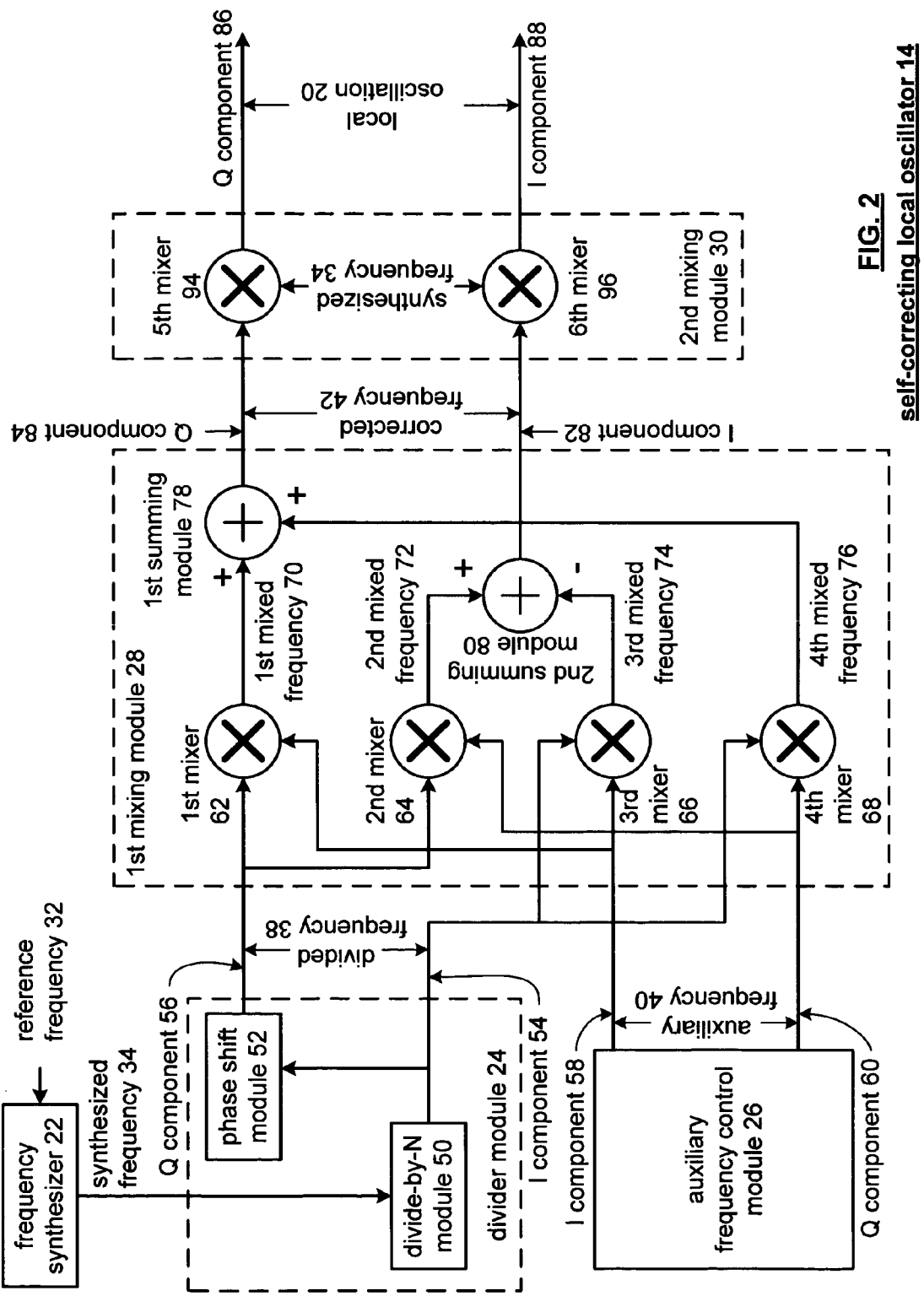
FIG. 2 self-correcting local oscillator 14

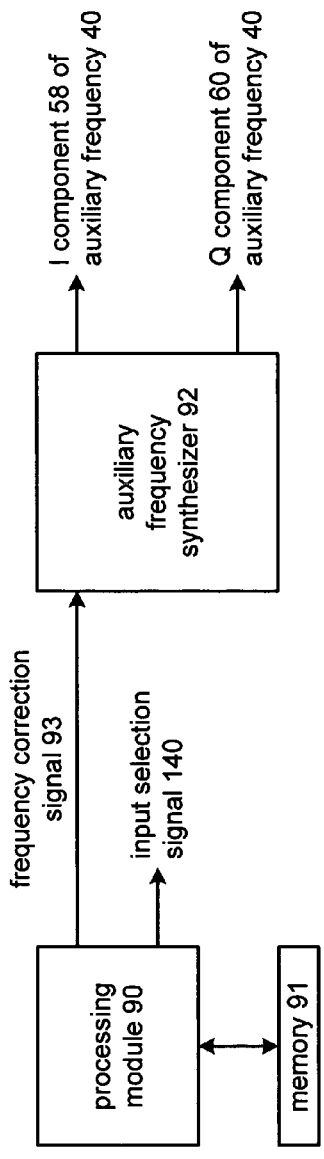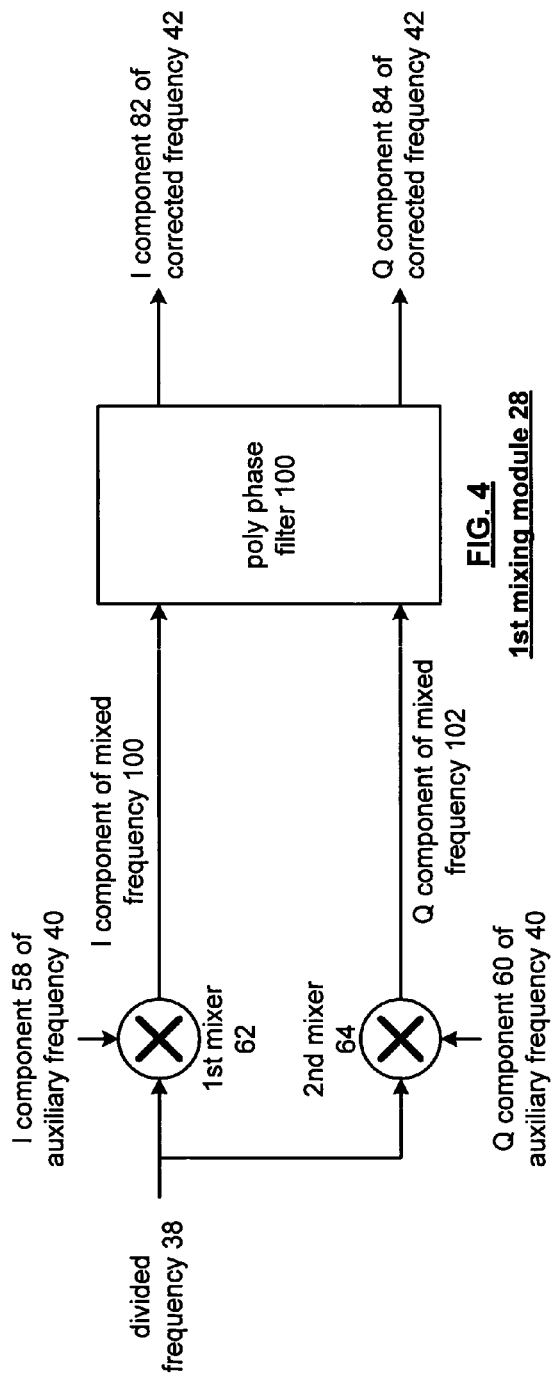

frequency response of FIG. 6

GENERATION OF A SELF-CORRECTING LOCAL OSCILLATION

This patent application is claiming priority under 35 USC § 120 to patent application entitled METHOD AND APPARATUS OF GENERATING A SELF-CORRECTING LOCAL OSCILLATION, having a Ser. No. of 10/055,581, and a filing date of Jan. 23, 2002, now issued as U.S. Pat. No. 6,850,745, on Jul. 24, 2003.

TECHNICAL FIELD OF THE INVENTION

This invention relates generally to wireless communications and more particularly to generating a local oscillation for use within wireless radio devices.

BACKGROUND OF THE INVENTION

As is known, in-home/in-building networks and point-to-point wireless communications occur between two or more wireless communication devices such as laptop computers, personal computers, personal digital assistants, Internet connections, hand held radios, et cetera. Such wireless communication devices include a transmitter section and a receiver section. In general, the transmitting section includes a modulator, an up-conversion intermediate frequency (IF) stage, and a power amplifier to drive an antenna. The receiving section generally includes a low noise amplifier operably coupled to an antenna, a down-conversion IF stage, and a demodulator.

To transmit data from one wireless communication device to another, the modulator of the transmitting section of the initiating device modulates the data to produce modulated data. The up-conversion IF stage mixes the modulated data with a local oscillation to produce an RF signal that is amplified by the power amplifier and transmitted via the antenna. A local oscillator generates the local oscillation from a crystal oscillator circuit within the initiating device.

The receiving section of the targeted device receives, via its antenna, the RF signal, which is amplified by the low noise amplifier. The RF signal is then mixed with a local oscillation via the down-conversion IF stage to produce an IF signal or base-band signal. The demodulator demodulates the IF signal or base-band signal to recapture the data. A local oscillator in the receiving section of the receiving device generates the local oscillation that is used for the down conversion of the RF signal. The particular modulation scheme and subsequent demodulation scheme used by the initiating device and targeted device is dependent on the particular wireless communication protocol adhered to by such devices. For example, the wireless communication protocol may be Bluetooth, IEEE 802.11a, IEEE 802.11b, code division multiple access (CDMA), analog mobile phone service (AMPS), digital AMPS, global system for mobile (GSM), wireless application protocol (WAP) and/or any other wireless communication standard.

Typically, the local oscillation used by the receiving section and transmitting section in each wireless communication device is derived from a crystal oscillator and a phase locked loop. Since crystal oscillators are generally inaccurate devices (e.g., have an error of +/−5%), the local oscillation produced by one wireless communication device may not be the same local oscillation as produced by another wireless communication device. When this occurs, a DC offset results in the receiving section of the targeted wireless communication device. Such a DC offset can cause errors in the recapturing of the data. The errors caused by the DC offset may be magnified when the wireless communication devices employ complex modulation schemes.

As is further known, in-home/in-building networking and point-to-point wireless communications are governed by a variety of standards including Bluetooth, IEEE802.11a, IEEE802.11b, et cetera. Each of these standards provides guidelines for encoding/decoding and/or modulating/demodulating data. In addition, the standards specify a frequency band for the wireless conveyance of data. For example, the IEEE 802.11a standard specifies a frequency band of 5.15 gigahertz to 5.35 gigahertz and 6.725 gigahertz to 5.825 gigahertz and further specifies a modulation scheme of orthogonal frequency division multiplexing (OFDM).

For a wireless communication device to be compliant with the IEEE 802.11a standard, it must generate, for a direct down-conversion, a local oscillation that has a range of 5.18 gigahertz to 5.32 gigahertz and also a range of 5.745 gigahertz to 5.805 gigahertz. In addition, the local oscillation should be accurate within a few kilohertz such that it can be centered in the 16.25 megahertz bandwidth of each channel, which consists of 312.5 kilohertz sub-channels. Further, the local oscillation should be able to change its frequency very quickly to accommodate the channels. Consequently, a phase locked loop within the local oscillator cannot be used to adjust the frequency of the local oscillation since it is too slow (e.g., a PLL has a bandwidth of up to 60 kilohertz).

Therefore, a need exists for a method and apparatus of generating a self-correcting local oscillation that is accurate to within a few kilohertz and may be changed quickly to provide a range of local oscillations.

BRIEF DESCRIPTION OF THE DRAWINGS

FIG. 2 illustrates a schematic block diagram of a self-correcting local oscillator in accordance with the present invention;

FIG. 3 illustrates a schematic block diagram of an auxiliary frequency control module in accordance with the present invention;

FIG. 4 illustrates a schematic block diagram of a mixing module in accordance with the present invention;

DETAILED DESCRIPTION OF A PREFERRED EMBODIMENT

Generally, the present invention provides a method and apparatus for generating a self-correcting local oscillation. Such a method and apparatus includes processing that begins by generating a frequency correction signal that represents undesired tones introduced by the self-correcting local oscillation. The processing continues by generating an auxiliary frequency based on the frequency correction signal. The processing continues by compensating a synthesized frequency based the auxiliary frequency to produce a local oscillation. With such a method and apparatus, an accurate readily adjustable local oscillator is achieved.

Figure 1:
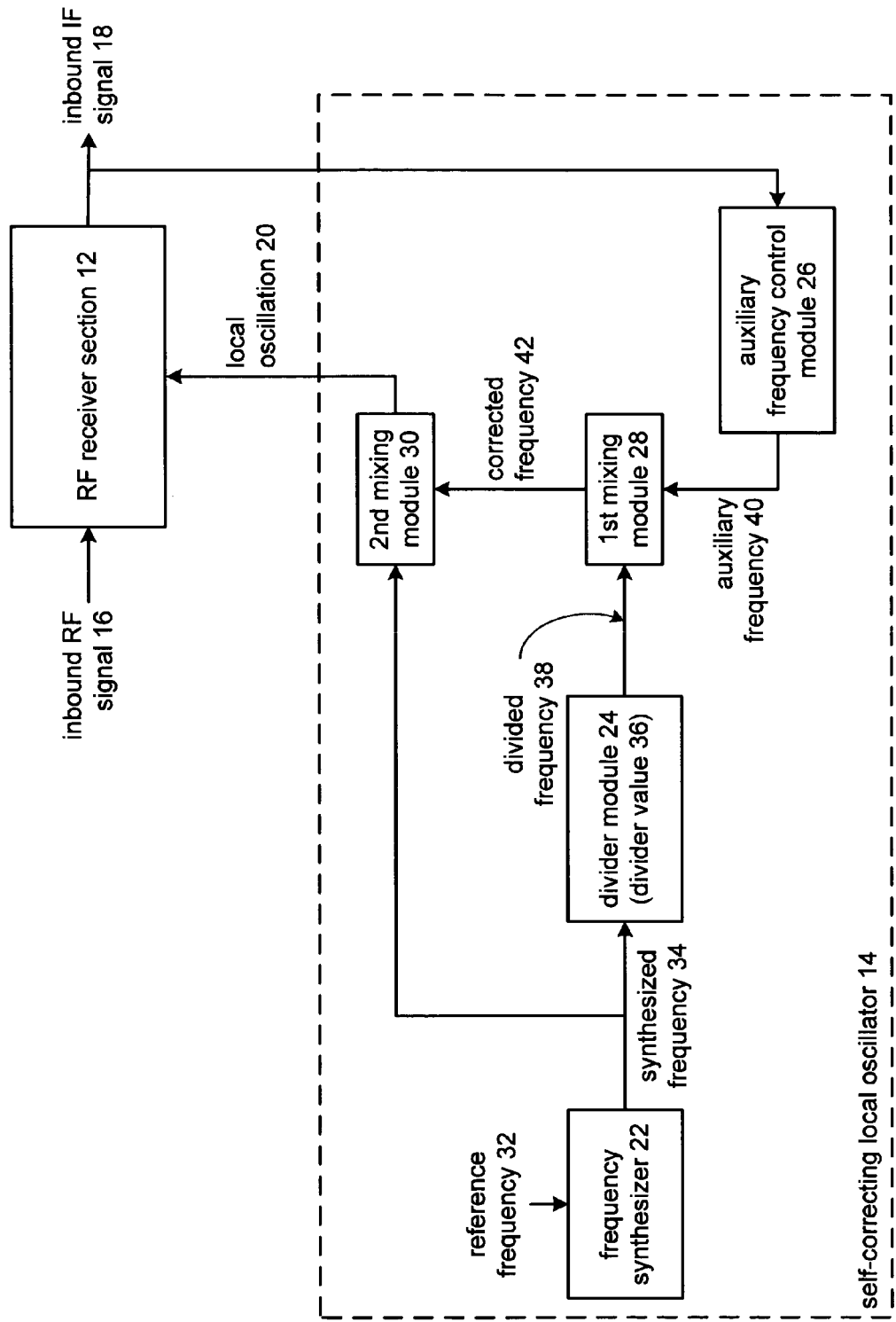
FIG. 1 illustrates a schematic block diagram of an integrated radio receiver in accordance with the present invention.

The present invention can be more fully described with reference to FIGS. 1 through 12. FIG. 1 illustrates a schematic block diagram of an integrated radio receiver 10 that includes an RF receiving section 12 and a self-correcting local oscillator 14. The RF receiver section 12 is operably coupled to receive an inbound RF signal 16 and a local oscillation 20. From these inputs, the RF receiver section 12 produces an inbound intermediate frequency (IF) signal 18. For example, the inbound RF signal 16 may be modulated in accordance with the IEEE 802.11a standard such that it has a frequency range of 5.15 gigahertz to 5.35 gigahertz and another range of 5.725 gigahertz to 5.825 gigahertz. Accordingly, the local oscillation 20 will have a frequency range of 5.18 gigahertz to 5.32 gigahertz and 5.745 gigahertz to 5.805 gigahertz. The inbound IF signal 18 will be at base-band. A demodulator, which is not shown, will process the inbound IF signal 18 to retrieve data from the modulated data.

The self-correcting local oscillator 14 includes a frequency synthesizer 22, a divider module 24, a $1^{st}$ mixing module 28, a $2^{nd}$ mixing module 30, and an auxiliary frequency control module 26. The frequency synthesizer 22 generates a synthesized frequency 34 from a reference frequency 32. For example, a crystal oscillator may generate the reference frequency 32 to have a frequency in the range of 10 to 20 megahertz. The frequency synthesizer 22 may be a phase locked loop (PLL) that produces the synthesized frequency 34 to be approximately ⅔rds the desired frequency of the local oscillation 20.

In an embodiment, the phase locked loop incorporates a $3^{rd}$ order mash Delta Sigma modulator to provide fractional divisors that allow for a large range of reference crystal selections and a wide phase locked loop bandwidth for faster loop locking time and better noise suppression. The PLL includes a phase/frequency detector, a charge pump, a low pass filter, voltage controlled oscillator that generates the synthesized frequency 34 and a multi-modulus divider. The multi-modulus divider, which provides the reference frequency to the phase frequency detector, has its inputs determined by the Delta Sigma modulator and a constant factor corresponding to the channel selected for transmission of data.

The multi-modulus divider dynamically changes the divisor value based on the output of the Delta Sigma modulator such that the average output over several reference cycles is the fractional value necessary to generate the correct output frequency. The multi-modulus divider may be implemented using 6 stages of divide by ⅔rds dividers, which provides a divisor range between the values of 64 and 127. Such a divisor range allows for a reference crystal range of 16 megahertz to 24 megahertz to produce the desired synthesized frequency 34 for use in an IEEE 802.11a compliant radio receiver.

The divider module 24 divides the synthesized frequency 34 by a divider value 36. Accordingly, the divider module 24 produces a divided frequency 38. If the synthesized frequency 34 is generated to be ⅔rds of the local oscillation, the divider value 36 will be 2. As such, the divided frequency 38 will be of half the frequency as that of the synthesized frequency 34 and ⅓ of the frequency of the local oscillation.

The auxiliary frequency control module 26 generates an auxiliary frequency 40 in the 100 kilohertz to 300 kilohertz range. The auxiliary frequency control module 26 generates the auxiliary frequency 40 to compensate for frequency spectrum errors within the local oscillator 14 and/or generates the auxiliary frequency based on a fine tuning frequency selection. The fine tuning of the auxiliary frequency 40 allows for the local oscillation 20 to be centered within desired channels of an IEEE 802.11a transmission. The details of the auxiliary frequency control module 26 will be described in greater detail with reference to FIGS. 3 and 6 through 12.

The $1^{st}$ mixing module 28 mixes the divided frequency 38 with the auxiliary frequency 40 to produce a corrected frequency 42. If the self-correcting local oscillator 24 is to generate a local oscillation 20 for use in an IEEE802.11a compliant radio receiver, the synthesized frequency will be in the range of 3.45 gigahertz to 3.87 gigahertz. Accordingly, the divided frequency 38 will be 1.72 gigahertz to 1.94 gigahertz. Since the auxiliary frequency 40 is in the range of 100 to a few hundred kilohertz, the corrected frequency 42 is a small fraction greater than the divided frequency 38.

The $2^{nd}$ mixing module 30 mixes the synthesized frequency 34, which has a frequency that is ⅔rds of the local oscillation, with the corrected frequency 42, which has a frequency of approximately $⅓^{rd}$ the local oscillation. Thus, when the synthesized frequency 34 is summed with the corrected frequency 42 the local oscillation 20 is produced. By generating the local oscillation 20 from the synthesized frequency and the divided frequency 38, the affects of the local oscillator pulling on the phase locked loop output are substantially reduced.

FIG. 2 illustrates a more detail schematic block diagram of the self-correcting local oscillator 14. The local oscillator 14 includes the frequency synthesizer 22, the divider module 24, the auxiliary frequency control module 26, which produces an I component 58 and a Q component 60 of the auxiliary frequency 40, the $1^{st}$ mixing module 28 and the $2^{nd}$ mixing module 30. The divider module 24 includes a divide by N module 50 and a phase shift module 52. In this embodiment, the divider module 24 produces an I component 54 and a Q component 56 of the divided frequency 38.

The $1^{st}$ mixing module 28 includes a $1^{st}$ mixer 62, a $2^{nd}$ mixer 64, a $3^{rd}$ mixer 66, a $4^{th}$ mixer 68, a $1^{st}$ summing module 78 and a $2^{nd}$ summing module 80. The $1^{st}$ mixer 62 is operably coupled to mix the Q component 56 of the divided frequency 38 with the I component 58 of the auxiliary frequency 40 to produce a $1^{st}$ mixed frequency 70. The $2^{nd}$ mixer 64 is operably coupled to mix the Q component 56 of the divided frequency 38 with the Q component 60 of the auxiliary frequency 40 to produce a $2^{nd}$ mixed frequency 72. The $3^{rd}$ mixer 66 is operably coupled to mix the I component 54 of the divided frequency 38 with the I component 58 of the auxiliary frequency 40 to produce a $3^{rd}$ mixed frequency 74. The $4^{th}$ mixer 68 is operably coupled to mix the I component 54 of the divided frequency 38 with the Q component 60 of the auxiliary frequency 40 to produce a $4^{th}$ mixed frequency 76.

The $1^{st}$ summing module 78 is operably coupled to sum the $1^{st}$ mixed frequency 70 with the $4^{th}$ mixed frequency 76 to produce a Q component 84 of the corrected frequency 42. The $2^{nd}$ summing module 80 is operably coupled to sum the $2^{nd}$ mixed frequency 72 with the $3^{rd}$ mixed frequency 74 to produce an I component 82 of the corrected frequency 42.

While the $1^{st}$ mixing module 28 allows for mixing of the auxiliary frequency 40 into the local oscillation 20, it introduces unwanted tones due to the DC offset in the mixers and the phase/gain mismatches of the mixers. The DC offset causes a local oscillation feed through tone at approximately M the synthesized frequency and the phase/gain mismatches create an unwanted image tone at M the synthesized frequency minus the auxiliary frequency. The auxiliary frequency control module 26, as will be discussed in greater detail with reference to FIGS. 3 and 6 through 10, minimizes the affects of these unwanted tones to achieve the desired benefits of mixing the auxiliary frequency into the local oscillation. As previously mentioned, by adding the auxiliary frequency into the local oscillation, the local oscillation can be finely tuned with accuracies greater than 0.1%.

The $2^{nd}$ mixing module 30 includes a $5^{th}$ mixer 94 and a $6^{th}$ mixer 96. The $5^{th}$ mixer 94 is operably coupled to mix the Q component 84 of the corrected frequency 42 with a Q component of the synthesized frequency 34. The resultant is the Q component 86 of the local oscillation 20. The $6^{th}$ mixer 96 is operably coupled to mix the I component 82 of the corrected frequency 42 with an I component of the synthesized frequency 34 to produce an I component 88 of the local oscillation 20.

FIG. 3 illustrates a schematic block diagram of the auxiliary frequency control module 26. The auxiliary frequency control module 26 includes an auxiliary frequency synthesizer 92, a processing module 90, and memory 91. The processing module 90 may be a single processing device or a plurality of processing devices. Such a processing device may be a microcontroller, microcomputer, microprocessor, digital signal processor, field programmable gate array, programmable logic device, state machine, logic circuitry, central processing unit, and/or any device that manipulates signals (analog and/or digital) based on operational instructions. The memory 91 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 92 implements one or more of its functions via a state machine or logic circuitry, the memory storing the corresponding operational instructions is embedded within the circuitry comprising the state machine and/or logic circuit. The processing module 90 implements one or more of the processing steps illustrated in FIGS. 9 through 12.

In general, the processing module 90 generates a frequency correction signal 93 to correct for the tones introduced by the mixers within the $1^{st}$ mixing module. In addition, the frequency correction signal 93 may include further information to indicate the particular fine tuning required of the local oscillation 20.

The processing module 90 may also produce an input selection signal 140, which places the radio receiver 10 in a test mode or normal mode. The use of the input selection signal 140 will be described in greater detail with reference to FIGS. 5 and 6.

The auxiliary frequency synthesizer 92, which may be a phase locked loop, direct digital frequency synthesizer, or any other device that generates a sinusoidal reference signal, produces the I component 58 of the auxiliary frequency 40 and the Q component 60 of the auxiliary frequency 40 based on the frequency correction signal 93.

FIG. 4 illustrates an alternate schematic block diagram of the $1^{st}$ mixing module 28. The $1^{st}$ mixing module 28 includes a $1^{st}$ mixer 62, a $2^{nd}$ mixer 64, and a polyphase filter 100. The lot mixer 62 is operably coupled to mix an I component of the divided frequency 38 with an I component 58 of the auxiliary frequency 40. The $1^{st}$ mixing module 62 produces an I component of the mixed frequency 100. The $2^{nd}$ mixer 64 is operably coupled to mix the divided frequency 38 with a Q component 60 of the auxiliary frequency 40 to produce a Q component 102 of the mixed frequency.

The polyphase filter 100, which includes filtering to reject images produces by the $1^{st}$ and $2^{nd}$ mixers, generates the I component 82 of the corrected frequency 42 and the Q component 84 of the corrected frequency 42. For a more detailed discussion of the polyphase filter 100, refer to co-pending Patent Application entitled Adaptive Radio Transceiver with Filtering, having a serial number of Ser. No. 09/692,420, a filing date of Oct. 19, 2000 and is assigned to the same Assignee as the present application.

Figure 5:
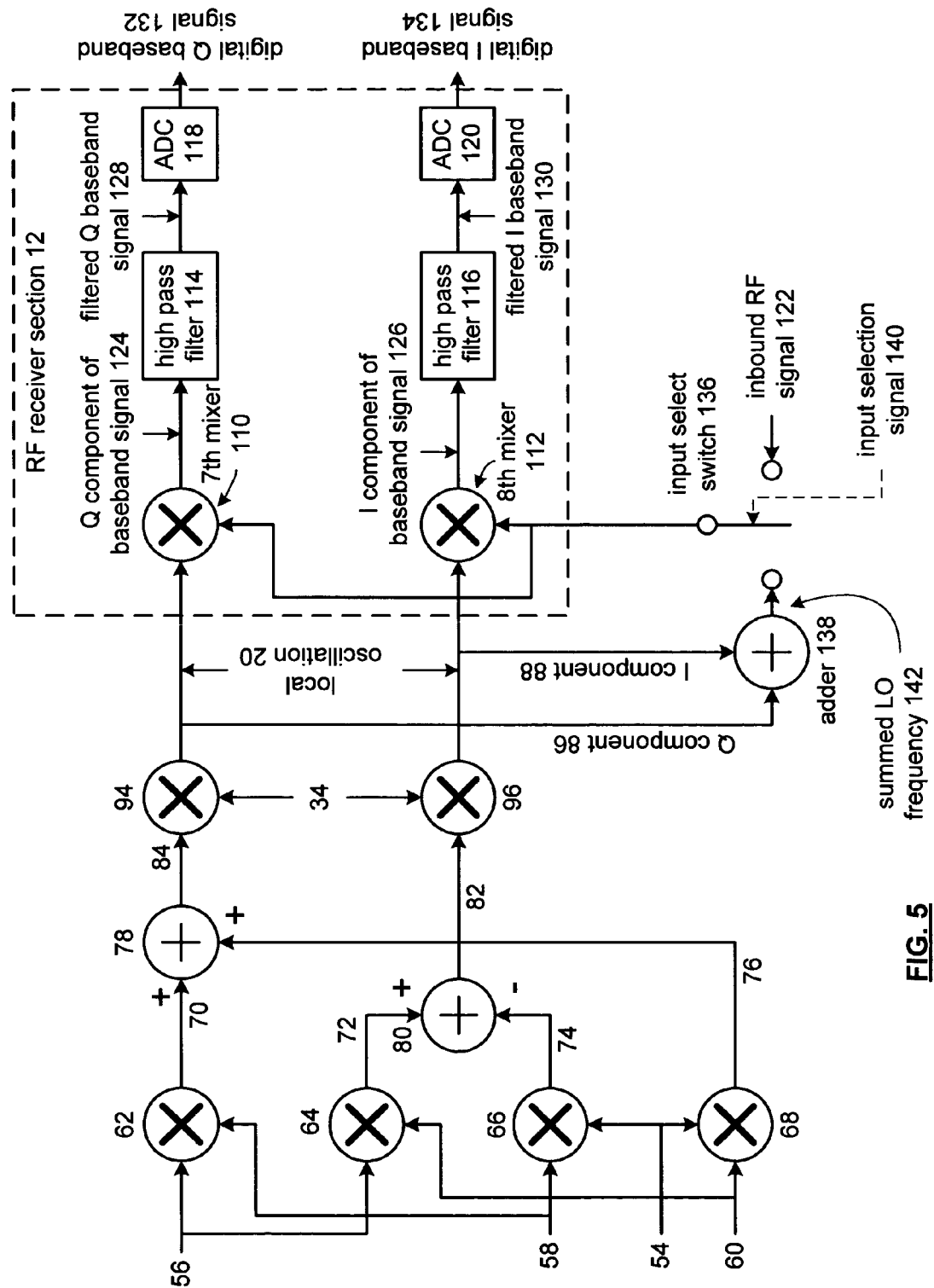
FIG. 5 illustrates a schematic block diagram of an integrated radio receiver in accordance with the present invention.

FIG. 5 illustrates a schematic block diagram of the radio receiver 10 to include the 4 mixers 62 through 64 of the $1^{st}$ mixing module 28, the $1^{st}$ and $2^{nd}$ summing modules 78 and 80 of the $1^{st}$ mixing module, the $5^{th}$ and $6^{th}$ mixers 94 and 96 of the $2^{nd}$ mixing module 30, the RF receiver section 12, an input selection switch 136 and an adder 138. The functionality of the $1^{st}$ and $2^{nd}$ mixing modules 28 and 30 are as previously discussed to produce the I and Q components 88 and 86 of the local oscillation 20.

The RF receiver section 12 includes a $7^{th}$ mixer 110, an $8^{th}$ mixer 112, a high-pass filter 114, a high-pass filter 116, an analog to digital converter 118, and an analog to digital converter 120. The $7^{th}$ mixer 110 is operably coupled to mix the Q component 86 of the local oscillation 20 with either the output of adder 138 or the inbound RF signal 122. The particular input provided to the $7^{th}$ mixer 110 is based on the input selection signal 140. For normal operations, the input selection signal 140 causes the input selection switch 136, which may be a physical switch, a logical switch, and/or combination thereof, to couple the input RF signal 122 to the $7^{th}$ and $8^{th}$ mixers 110 and 112. During test mode, the input selection signal 140 causes the summed local oscillation 142 to be provided to the $7^{th}$ and $8^{th}$ mixers 110 and 112. The test mode will be described in greater detail with reference to FIG. 6.

When the inbound RF signal 122 is coupled to the $7^{th}$ and $8^{th}$ mixers, the functionality of the RF section 12 produces the digital I base-band signal 134 and digital Q base-band signal 132. In operation, the $7^{th}$ mixer 110 mixes the Q component of local oscillation 20 with a Q component of the inbound RF signal 122 to produce a Q component of base-band signal 124. The high-pass filter 114 filters the Q component of base-band signal 124 to produce a filtered Q base-band signal 128. The analog to digital converter 118 converts the filtered Q base-band signal 128 into the digital Q base-band signal 132. Similarly, the $8^{th}$ mixer 112 mixes an I component of local oscillation 20 with an I component of the inbound RF signal 122 to produce an I component of base-band signal 126. The high pass filter 116 filters the I component of the base-band signal 126 to produce a filtered I base-band signal 130. The analog to digital converter 120 converts the filtered I base-band signal 130 into the digital I base-band signal 134.

Figure 6:
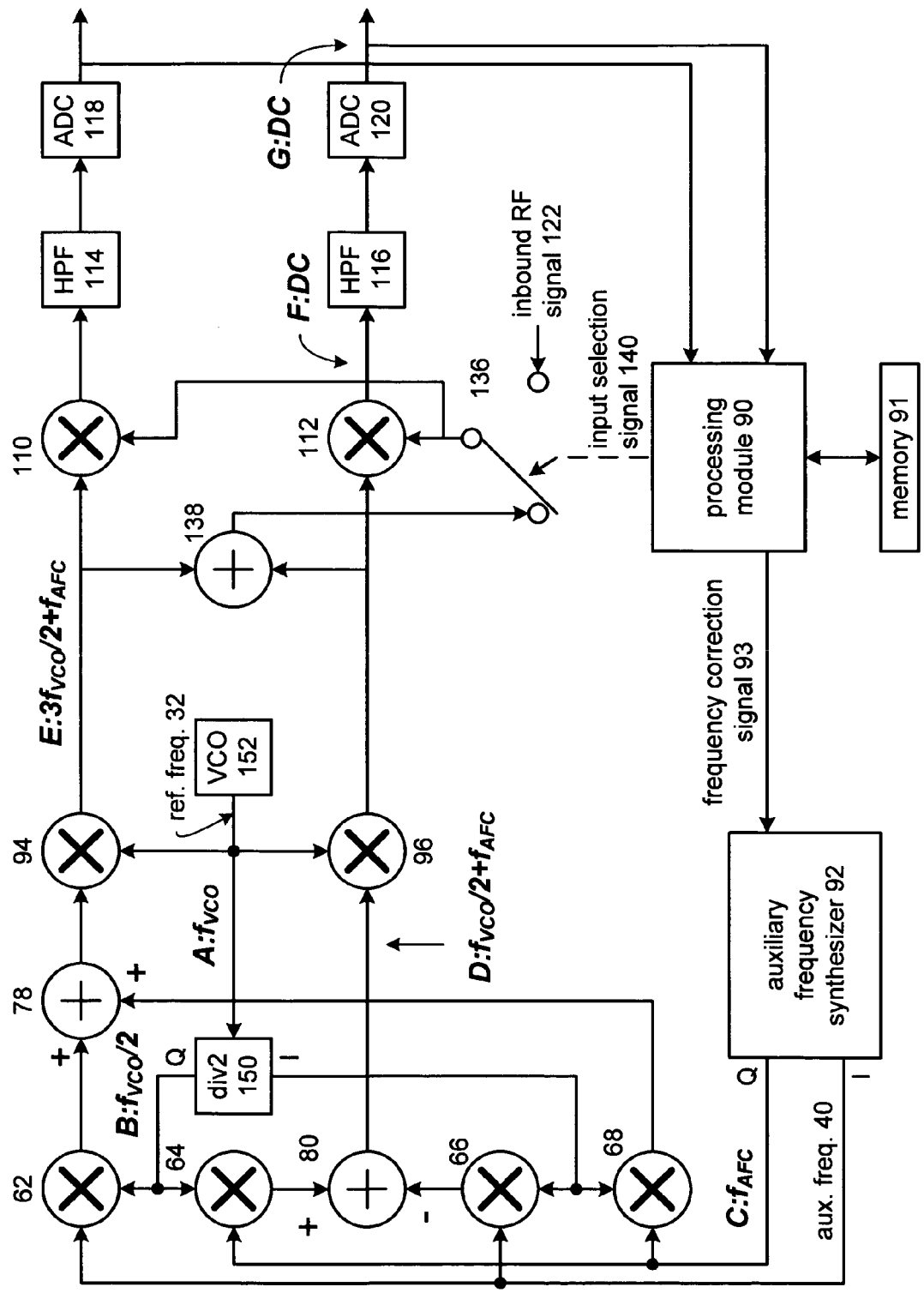
FIG. 6 illustrates a schematic block diagram of the radio receiver of FIG. 5 in a test mode in accordance with the present invention.
Figure 7:
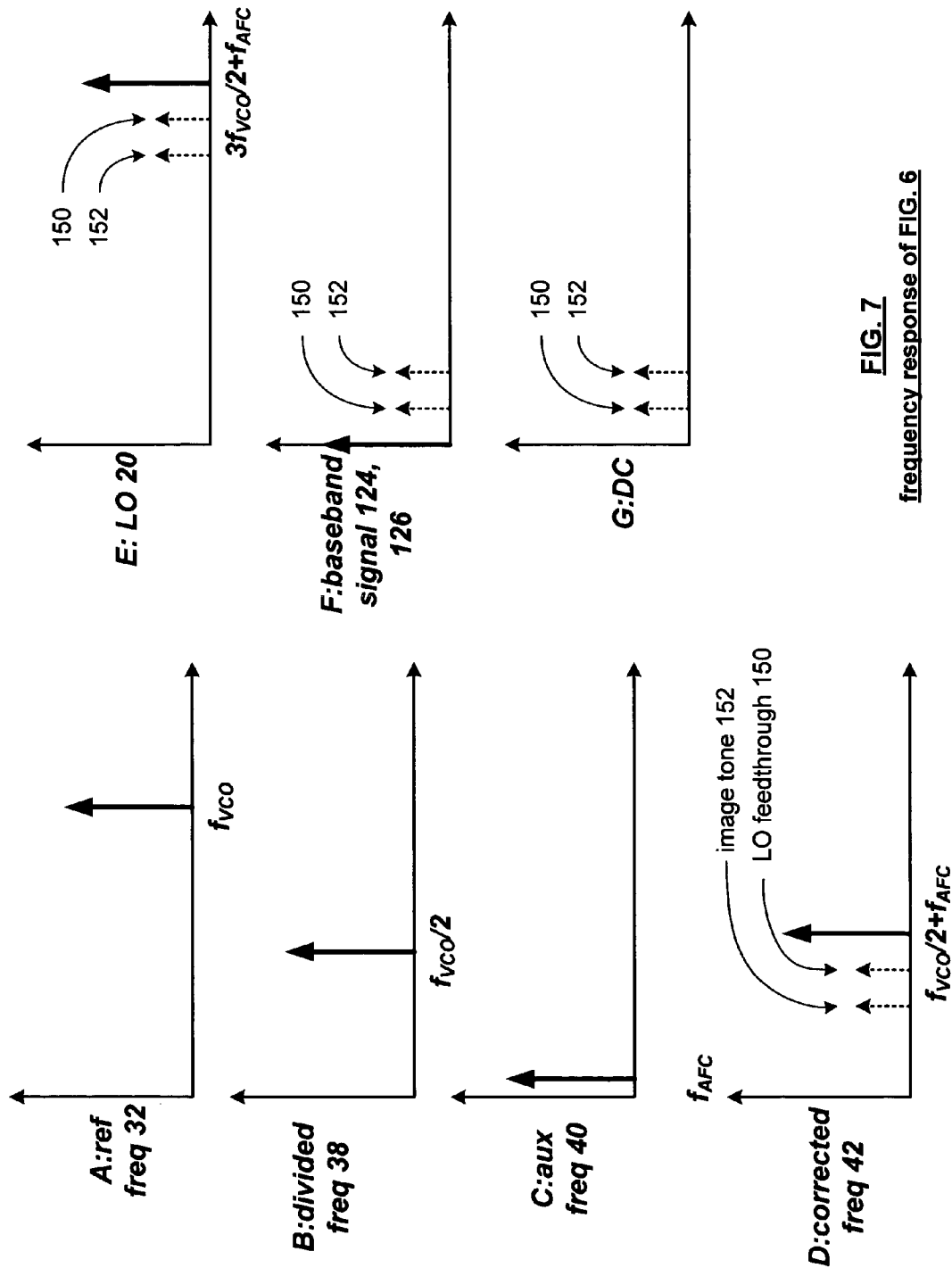
FIG. 7 illustrates a frequency response of the radio receiver of FIG. 6.

FIG. 6 illustrates the radio receiver 10 being configured for test mode. In this configuration, the processing module 90 generates the input selection signal 140 to couple the output of summing module 138 to the $7^{th}$ and $8^{th}$ mixers 110 and 112. As is further illustrated in FIG. 6, various signals are identified by letters A through G. The frequency response for each of these signals is illustrated in FIG. 7. Accordingly, the discussion with respect to FIG. 6 will also include a discussion with respect to FIG. 7. In this configuration, the voltage controlled oscillator 152 generates a reference frequency 32, which has a designation of $A:f_{vco}$. Referring to FIG. 7, the reference frequency 32 has a frequency response at the frequency of the voltage controlled oscillator. For example, if the radio receiver 10 is constructed to be compliant with IEEE 802.11a, the frequency produced by the voltage control oscillator will be in the range of 3.45 gigahertz to 3.87 gigahertz.

The divide by 2 module 150 receives the reference frequency 32 and produces an I and Q component of a divided frequency. The divided frequency is referenced as B:$f_{vco}/2$. Referring to FIG. 7, the divided frequency 38 has a frequency at ½ that of the voltage controlled oscillator.

The auxiliary frequency synthesizer 92 based on the frequency correction signal 93, which will be discussed in greater detail below, produces the auxiliary frequency 40, which is designated as C:$f_{AFC}$. Referring to FIG. 7, the frequency response for the auxiliary frequency is shown to have a substantially lower frequency than the divided frequency 38 or the reference frequency 32. For this implementation, the auxiliary frequency will range from a few kilohertz to a few hundred kilohertz.

Summing module 80 produces the corrected frequency 42, which is designated as D:$f_{vco}/2+f_{AFC}$. As shown in FIG. 7, the frequency response of the corrected frequency 42 includes the pulse, which corresponds to the ½ VCO frequency plus the AFC frequency and also shows an image tone 152 and a local oscillation feed-through 150. These tones are generated as a result of mixers 62 through 68 having phase/gain mismatches and DC offset. Since these tones cannot be completely eliminated because they are too close to the desired frequency, one of the functions of the processing module 90 in test mode is to minimize the impact of the tones 150 and 152.

The output of mixers 94 and 96 produce the local oscillation which is designed E:$3f_{vco}/2+f_{AFC}$. The frequency response of the local oscillation is shown in FIG. 7 to include a pulse at the local oscillation which is 1.5 times the voltage controlled oscillation frequency plus the automatic frequency control frequency plus the image tone and feed-through tone 150 and 152.

Mixers 110 and 112 mix the summation of the I and Q components of the local oscillation with the I and Q components of the local oscillation to produce a base-band signal. The base-band signal is designed as F:DC. Referring to the frequency response for point F, the base-band signal 124 and 126 has a pulse at 0 (i.e., at DC), and also includes the reflected images of tones 150 and 152.

The base-band signals 124 and 126 are passed through high-pass filters 114 and 116 and then converted to digital signals via ADC's 118 and 120. The resulting digital signal is designated as G:DC. The frequency response for the digital base-band signal is shown in FIG. 7 to include only the two tones, 150 and 152.

The processing module 90 is operably coupled to receive the digital representation of tones 150 and 152 and to produce the frequency correction signal 93 to minimize their magnitude. Accordingly, the auxiliary frequency synthesizer 92 may adjust its frequency based on the frequency correction signal 93 in an iterative manner to determine acceptable levels of the tones and/or the find an optimal frequency at which the tones are minimized.

Figure 8:
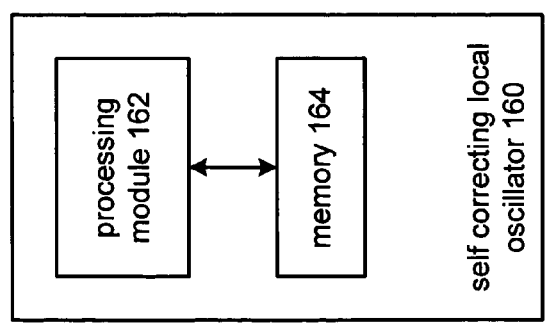
FIG. 8 illustrates a schematic block diagram of an alternate self-correcting local oscillator in accordance with the present invention.

FIG. 8 illustrates a schematic block diagram of an alternate self-correcting local oscillator 160 that includes a processing module 162 and memory 164. The processing module 162 may be a single processing device or a plurality of processing devices. Such a processing device may be a microprocessor, microcontroller, microcomputer, digital signal processor, field programmable gate array, programmable logic device, state machine or logic circuitry, and/or any device that manipulates signals (analog and/or digital) based on operational instructions. The memory 164 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 162 implements one or more of its functions via a state machine or logic circuitry, the memory storing the corresponding operational instructions is embedded within the circuitry comprising the state machine or logic circuitry. The operational instructions stored in memory 164 and executed by processing module 162 are generally illustrated in the logic diagrams of FIGS. 9 through 12.

Figure 9:
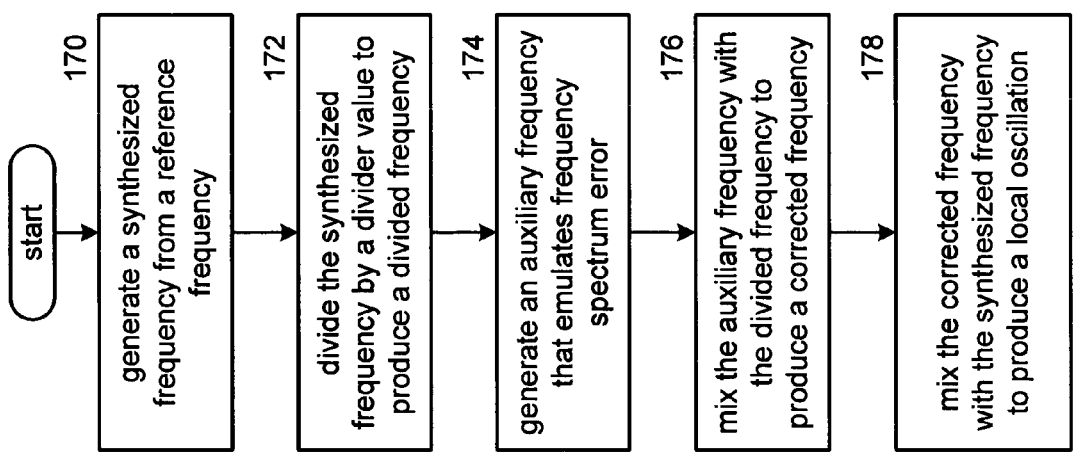

FIG. 9 illustrates a logic diagram of a method for generating a self-correcting local oscillation. The process begins at Step 170 where a synthesized frequency is generated from a reference frequency. This may be done utilizing a digital phase locked loop that up-converts a reference frequency, which may be produced by a crystal oscillator, to a desired frequency. For example, if the self-correcting local oscillator is to be used within a IEEE 802.11a compliant radio receiver or transmitter, the synthesized frequency would be generated to be ⅔rds of the frequency band indicated by the 802.11a specification.

The process then proceeds to Step 172 where the synthesized frequency is divided by a divider value to produce a divided frequency. For example, the divider value may be 2 such that the divided frequency has a frequency of /1;2the synthesized frequency. In addition, the divided frequency may include a phase delay such that an I component and a Q component of the divided frequency are produced. The process then proceeds to Step 174 where an auxiliary frequency is generated to emulate frequency spectrum errors and/or to provide fine tuning of the resulting local oscillation. The generation of the auxiliary frequency will be discussed in greater detail with reference to FIG. 10.

The process then proceeds to Step 176 where the auxiliary frequency is mixed with the divided frequency to produce a corrected frequency. This may be done by mixing an I component of the auxiliary frequency with a Q component of the divided frequency to produce a $1^{st}$ mixed frequency; mixing a Q component of the auxiliary frequency with the Q component of the divided frequency to produce a $2^{nd}$ mixed frequency; mixing the I component of the auxiliary frequency with the I component of the divided frequency to produce a $3^{rd}$ mixed frequency; mixing the Q component of the auxiliary frequency with the I component of the divided frequency to produce a $4^{th}$ mixed frequency; summing the $1^{st}$ mixed frequency with the $4^{th}$ mixed frequency to produce an I component of the corrected frequency; and summing the $2^{nd}$ mixed frequency and the $3^{rd}$ mixed frequency to produce an I component of the corrected frequency.

As an alternative method for producing the corrected frequency, the divided frequency may be mixed with an I component of the auxiliary frequency to produce an I component of a mixed frequency. The divided frequency may also be mixed with a Q component of the auxiliary frequency to produce a Q component of the mixed frequency. The I and Q components of the mixed frequency may be then filtered by a polyphase filter to produce an I and Q component of the corrected frequency.

The process then proceeds to Step 178 where the corrected frequency is mixed with the synthesized frequency to produce a local oscillation.

Figure 10:
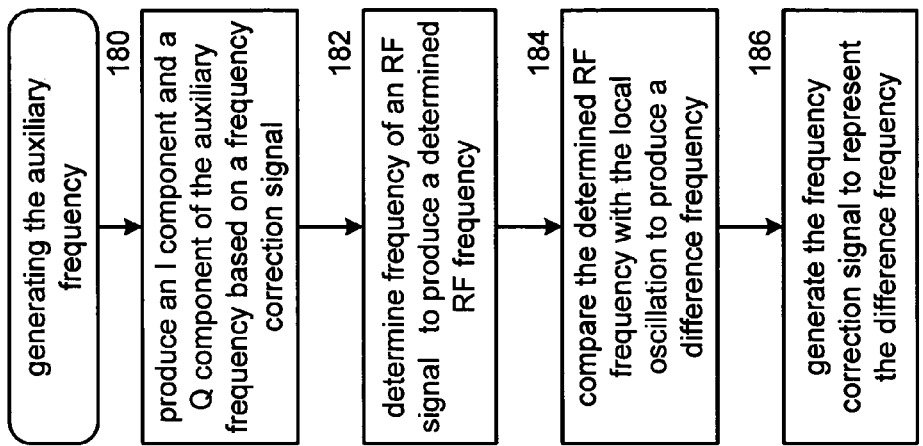
FIGS. 9 through 11 illustrate a logic diagram of generating a self-correcting local oscillation in accordance with the present invention.

FIG. 10 illustrates a method for generating the auxiliary frequency to provide fine tuning of the local oscillation. The process begins at Step 180 where an I and Q component of the auxiliary frequency are produced based on a frequency correction signal. The process then proceeds to Step 182 where the frequency of an RF signal is determined. The process then proceeds to Step 184 where the determined RF frequency is compared with the frequency of the local oscillation to produce a difference frequency. The process then proceeds to Step 186 where the frequency correction signal is generated to represent the difference frequency. As such, the auxiliary frequency is set to adjust the local oscillation to substantially equal the reference frequency and/or to center the local oscillation within a channel within the spectrum represented by the received RF signal.

Figure 11:
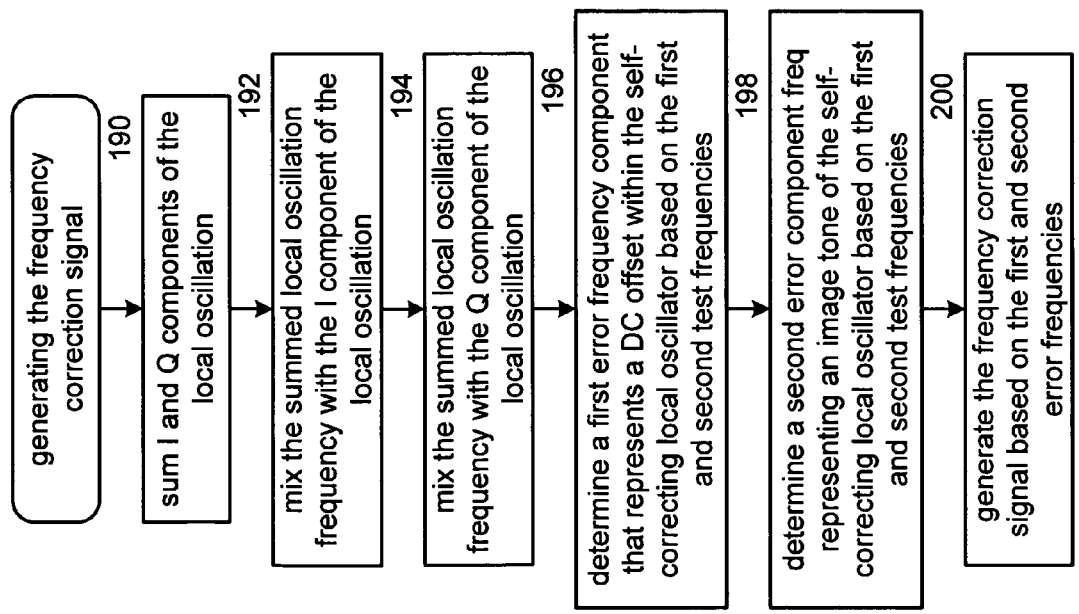

FIG. 11 illustrates a method for generating the frequency correction signal during test mode. The process begins at Step 190 where the I and Q components of the local oscillation are summed to produce a summed local oscillation. The process then proceeds to Step 192 where the summed local oscillation is mixed with the I component of the local oscillation to produce a $1^{st}$ test frequency. The process then proceeds to Step 194 where the summed local oscillation is mixed with the Q component of the local oscillation to produce a $2^{nd}$ test frequency.

The process then proceeds to Step 196 where a $1^{st}$ error of frequency component that represents a DC offset within the self-correcting local oscillator is determined based on the $1^{st}$ and $2^{nd}$ test frequencies. The process then proceeds to Step 198 where a $2^{nd}$ error component frequency representing an image tone of the self-correcting local oscillator is determined based on the $1^{st}$ and $2^{nd}$ test frequencies. The process then proceeds to Step 200 where the frequency correction signal is generated to minimize the $1^{st}$ and $2^{nd}$ error frequencies. This was graphically illustrated with reference to FIGS. 6 and 7.

The preceding discussion has presented a method and apparatus for generating a self-correcting local oscillation. The self-correcting local oscillation includes an auxiliary frequency controller that allows for fine tuning of the local oscillation and also includes a test mode for minimizing tones produced by the injection of the auxiliary frequency. Accordingly, an accurate and readily changeable local oscillator is achieved that may be particularly useful for IEEE 802.11a applications. As one of average skill in the art will appreciate, other embodiments may be derived from the teaching of the present invention, without deviating from the scope of the claims.

What is claimed is:

1. A method for generating a self-correcting local oscillation, the method comprises:
   generating a frequency correction signal that represents undesired tones introduced by the self-correcting local oscillation;
   generating an auxiliary frequency based on the frequency correction signal, wherein the generating the auxiliary frequency includes:
      producing an I component and a Q component of the auxiliary frequency based on at least one of the frequency correction signal and a fine tuning signal;
      determining a frequency of a received radio frequency (RE) signal to produce a determined RE frequency;
      comparing the determined RF frequency with the local oscillation to produce a difference frequency; and
      generating the frequency correction signal to represent the difference frequency; and
   compensating a synthesized frequency based on the auxiliary frequency to produce a local oscillation.

2. The method of claim 1, wherein the generating the frequency correction signal further comprises:
   summing I and Q components of the local oscillation to produce a summed local oscillation;
   mixing the summed local oscillation with the I component of the local oscillation to produce a first test frequency;
   mixing the summed local oscillation with the Q component of the local oscillation to produce a second test frequency;
   determining a first error frequency component that represents a DC offset within the self-correcting local oscillator based on the first and second test frequencies;
   determining a second error component frequency representing an image tone of the self-correcting local oscillator based on the first and second test frequencies; and
   generating the frequency correction signal based on the first and second error frequencies.

3. A self-correcting local oscillator comprises:
   processing module; and
   memory operably coupled to the processing module, wherein the memory includes operational instructions that cause the processing module to:
      generate a frequency correction signal that represents undesired tones introduced by the self-correcting local oscillation;
      generate an auxiliary frequency based on the frequency correction signal; and
      compensate a synthesized frequency based on the auxiliary frequency to produce a local oscillation.

4. The self-correcting local oscillator of claim 3, wherein the memory further comprises operational instructions that cause the processing module to generate the auxiliary frequency by:
   producing an I component and a Q component of the auxiliary frequency based on at least one of:
   the frequency correction signal and a fine tuning signal;
   determining frequency of a received radio frequency (RF) signal to produce a determined RF frequency;
   comparing the determined RF frequency with the local oscillation to produce a difference frequency; and
   generating the frequency correction signal to represent the difference frequency.

5. The self-correcting local oscillator of claim 3, wherein the memory further comprises operational instructions that cause the processing module to generate the frequency correction signal by:
   summing I and Q components of the local oscillation to produce a summed local oscillation;
   mixing the summed local oscillation with the I component of the local oscillation to produce a first test frequency;
   mixing the summed local oscillation with the Q component of the local oscillation to produce a second test frequency;
   determining a first error frequency component that represents a DC offset within the self-correcting local oscillator based on the first and second test frequencies;
   determining a second error component frequency representing an image tone of the self-correcting local oscillator based on the first and second test frequencies; and
   generating the frequency correction signal based on the first and second error frequencies.

6. The self-correcting local oscillator of claim 3, wherein the memory further comprises operational instructions that cause the processing module to generate of the auxiliary frequency by:
  producing an I component and a Q component of the auxiliary frequency based on a frequency correction signal;
  summing I and Q components of the local oscillation to produce a summed local oscillation;
  mixing the summed local oscillation with the I component of the local oscillation to produce a first test frequency;
  mixing the summed local oscillation with the Q component of the local oscillation to produce a second test frequency;
  determining a first error frequency component that represents a DC offset within the self-correcting local oscillator based on the first and second test frequencies;
  determining a second error component freq representing an image tone of the self-correcting local oscillator based on the first and second test frequencies; and
  generating the frequency correction signal based on the first and second error frequencies.

7. A method for generating a self-correcting local oscillation, the method comprises:
  generating a frequency correction signal that represents undesired tones introduced by the self-correcting local oscillation;
  generating an auxiliary frequency based on the frequency correction signal, wherein the generating the auxiliary frequency includes:
    producing an I component and a Q component of the auxiliary frequency based on a frequency correction signal;
    summing I and Q components of the local oscillation to produce a summed local oscillation;
    mixing the summed local oscillation with the I component of the local oscillation to produce a first test frequency;
    mixing the summed local oscillation with the Q component of the local oscillation to produce a second test frequency;
    determining a first error frequency component that represents a DC offset within the self-correcting local oscillator based on the first and second test frequencies;
    determining a second error component freq representing an image tone of the self-correcting local oscillator based on the first and second test frequencies; and
    generating the frequency correction signal based on the first and second error frequencies; and
  compensating a synthesized frequency based on the auxiliary frequency to produce a local oscillation.

* * * * *